US008671096B2

(12) United States Patent
Lu et al.

(10) Patent No.: US 8,671,096 B2
(45) Date of Patent: Mar. 11, 2014

(54) METHODS AND APPARATUS FOR CONTEXT-SENSITIVE INFORMATION RETRIEVAL BASED ON INTERACTIVE USER NOTES

(75) Inventors: Jie Lu, Hawthorne, NY (US); Michelle X. Zhou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 12/257,660

(22) Filed: Oct. 24, 2008

(65) Prior Publication Data

US 2010/0106485 A1    Apr. 29, 2010

(51) Int. Cl.
*G06F 17/30* (2006.01)
*G06F 17/27* (2006.01)

(52) U.S. Cl.
USPC ............................................. 707/736; 704/9

(58) Field of Classification Search
None
See application file for complete search history.

(56) References Cited

U.S. PATENT DOCUMENTS

| | | | |
|---|---|---|---|
| 7,176,921 B2* | 2/2007 | Rising et al. | 345/440 |
| 2002/0091709 A1* | 7/2002 | Jung | 707/104.1 |
| 2004/0015483 A1* | 1/2004 | Hogan | 707/3 |
| 2004/0187002 A1* | 9/2004 | Iida | 713/175 |
| 2005/0125219 A1* | 6/2005 | Dymetman et al. | 704/9 |
| 2006/0174211 A1* | 8/2006 | Hoellerer et al. | 715/782 |
| 2006/0287983 A1* | 12/2006 | Krauss et al. | 707/3 |
| 2007/0094256 A1* | 4/2007 | Hite et al. | 707/6 |
| 2009/0024962 A1* | 1/2009 | Gotz | 715/838 |
| 2009/0110288 A1* | 4/2009 | Fujiwara | 382/190 |

OTHER PUBLICATIONS

Allen et al., "An Architecture for more realistic conversational systems," In IUI '01 pp. 14-17 (2001).
Baldanado et al., "Sensemaker: an information-exploration interface supporting the contextual evolution of a user's interests," In CHI '97, pp. 11-18 (1997).
Billsus et al., "Improving proactive information systems," In IUI '05 pp. 159-166 (2005).
Budzik et al., "Watson: Anticipating and contextualizing information needs," In of AAIS '99, pp. 727-730 (1999).
Dumais et al., "Implicit Queries (IQ) for Contextualized Search," In SIGIR '04, pp. 594-595 (2004).
Gauch et al., "Ontology-based personalized search and browsing," Web Intelligence and Agent System, 1(3-4); pp. 219-234 (2003).
Goncalves et al., "InSearch of personal information: Narrative-based interfaces," In IUI '08, pp. 179-188 (2008).
Gyllstrom et al., "Seeing is retrieving: Building information context from what the user sees," In IUI '08, pp. 189-198 (2008).

(Continued)

*Primary Examiner* — Tarek Chbouki
(74) *Attorney, Agent, or Firm* — Ryan, Mason & Lewis, LLP

(57) ABSTRACT

Information retrieval systems and methods are provided based on interactive user notes. Information is retrieved from one or more data sources based on user notes by obtaining the user notes containing one or more information requests; identifying the one or more information requests from the user notes; interpreting at least one of the information requests in context; generating one or more queries required for the at least one interpreted information request; identifying an update to the user notes, the update containing one or more updated information requests; and processing the updated user notes to generate one or more queries required for the updated information requests. If the user notes contain multiple information requests, at least one query is generated for each of the plurality of information requests. The information requests can be interpreted based on user-specified context guides.

29 Claims, 9 Drawing Sheets

(56) References Cited

OTHER PUBLICATIONS

Houck et al., "Contextual revision in information-seeking conversation systems," In ICSP '04, pp. 201-204 (2004).
Kraft et al.,"Y!Q: contextual search at the point of inspiration," In CIKM '05, pp. 816-823 (2005).
Pan et al., "Two-way adaptation for robust input interpretation for practical multimodal interaction," In IUI '05, pp. 25-32 (2005).
Propescu et al., "Towards a theory of natural language interfaces to databases," In IUI '03, pp. 149-157 (2003).
Y. Qu, "A sensemaking-supporting information gathering system," Ini CHI '03, pp. 906-907 (2003).
Rhodes et al., "Just-in-time information retrieval agents," IBM Systems Journal, 39(3-4), pp. 685-704 (2000).
Shen et al., "Automatically finding and recommending resources to support knowledge worker's activities," In IUI '08, pp. 207-216 (2008).
Shen et al., "Context-sensitive information retrieval using implicit feedback," In SIGIR '05, pp. 43-50 (2005).
Shen et al., "Exploiting query history for document ranking in interactive information retrieval," In SIGIR '03, pp. 377-378 (2003).
M. Speretta, "Personalizing search based on user search histories," INCIKM '04 (2004).
Teevan et al., "Personalizing search via automated analysis of interests and activities," In SIGIR '05, pp. 449-456 (2005).
Tachinda et al., "Building data integration queries by demonstration," In IUI '07, pp. 170-179 (2007).
Tachinda et al., "Building mashups by example," In IUI '08, pp. 139-148 (2008).
Voorhees et al., "Overview of the TREC 2005 question answering track," In TREC '05 (2005).
Wen et al., "Context-aware adaptive information retrieval for investigative tasks," In IUI '07, pp. 122-131 (2007).
Xu et al., "Cluster-based language models for distributed retrieval," In SIGIR '99, pp. 254-261 (1999).
Zhou et al., "An optimization-based approach to dynamic data content selection in intelligent multimedia interfaces," In UIST '04, pp. 227-236 (2004).
Lu et al., "Context-Sensitive Information Retrieval Driven-by Interactive User Notes," Intelligent Multimedia Interaction (2007).
Zhou et al., "Enabling context-sensitive informaiton seeking," In IUI '06, pp. 112-123 (2006).
Dang et al., "Overview TREC 2007 Question Answering Track," National Institute of Standards and Technology (2007).

\* cited by examiner

```
1  *Restaurants near IBM Hawthorne
2
3  >Italian
4  name, address, phone number, avg customer rating
5  Tramonto, 27 Saw Mill River Rd., (914)347-8220, 3.5
6
7  >Chinese
8  Oriental Diner, 58 Saw Mill River Rd., (914)769-0038, 3.0
```

FIG. 2

| FIG. 2(1) | FIG. 2(2) |
|---|---|

FIG. 2(1)

TASK BAR 

New York
With the highest room rates in the country, choosing a hotel in New York City boils down to how much you want to spend. There are some relative bargains to be found, but don't expect room service or sunny views.
Picking a restaurant in New York City is a foodie's dream - or nightmare. There are loads of books and blogs devoted to the quest, especially with new restaurants arriving all the time to fuel the collective hunger.
Average hotel room rate: $275
Average restaurant rating: 2
*Hotel for 10/1/2008
　>Hilton
　There are 13 hotels listed.
　avg, min room rate
　Average room rate: $399
　Minimum room rate: $269
　hotel with min room rate
　Millenium Hilton, 55 Church Street
　　number
　　Phone: (212)693-2001, Fax: (212)571-2316
　>Marriott
　There are 9 hotels listed.
　　Average room rate: $359
　　Minimum room rate: $280
　　Hotel with minimum room rate: Courtyard New York Manhattan/Upper East Side, 410 East 92nd Street
　　　Phone: (212)410-6777, Fax: (212)423-1236

220 — NOTE AREA

FIG. 2(2)

240 241 [ Search ] [ Clear ]

| Current | History |

*DATABASE QUERY* phone number of hotel with minimum hotel room rate of hotel chain Hilton in New York on 2008-10-01
SELECT HOTELS1.PHONE_NUMBER FROM HOTELS HOTELS1, TOWNS TOWNS1 WHERE (HOTELS1.CHAIN = 'Hilton') AND (HOTELS1.DATE = '2008-10-01') AND (HOTELS1.ROOM_RATE = 269) AND TOWNS1. TYPE IN ('VILLAGE', 'TOWN', 'TOWN_VILLAGE', 'CITY', 'CDP') AND (TOWNS1.TOWN = 'New York') AND (HOTELS1.TOWN = TOWNS1.TOWN)
*DATABASE QUERY* fax number of hotel with minimum hotel room rate of hotel chain Hilton in New York on 2008-10-01
SELECT HOTELS1.FAX_NUMBER FROM HOTELS HOTELS1, TOWNS TOWNS1 WHERE (HOTELS1.CHAIN = 'Hilton') AND (HOTELS1.DATE = '2008-10-01') AND (HOTELS1.ROOM_RATE = 269) AND TOWNS1.TYPE IN ('VILLAGE', 'TOWN', 'TOWN_VILLAGE', 'CITY', 'CDP') AND (TOWNS1.TOWN = 'New York') AND (HOTELS 1. TOWN = TOWNS1. TOWN)
*DATABASE QUERY* phone number of hotel with minimum hotel room rate of hotel chain Marriott in New York on 2008-10-01
SELECT HOTELS1.PHONE_NUMBER FROM HOTELS HOTELS1, TOWNS TOWNS1 WHERE (HOTELS1. CHAIN = 'Marriott') AND (HOTELS1.DATE = '2008-10-01') AND (HOTELS1.ROOM_RATE = 280) AND TOWNS1.TYPE IN ('VILLAGE', 'TOWN', 'TOWN_VILLAGE', 'CITY', 'CDP') AND (TOWNS1.TOWN = 'New York') AND (HOTELS1.TOWN = TOWNS1.TOWN)
*DATABASE QUERY* fax number of hotel with minimum hotel room rate of hotel chain Marriott in New York: on 2008-10-01
SELECT HOTELS1.FAX_NUMBER FROM HOTELS HOTELS1, TOWNS TOWNS1 WHERE (HOTELS1.CHAIN = 'Marriott') AND (HOTELS1.DATE = '2008-10-01') AND (HOTELS1.ROOM_RATE = 280) AND TOWNS1.TYPE IN ('VILLAGE', 'TOWN', 'TOWN_VILLAGE', 'CITY', 'CDP') AND (TOWNS1.TOWN = 'New York') AND (HOTELS1.TOWN = TOWNS1.TOWN)

RESULT AREA

FIG. 4

| (a) | (b) | (c) | (d) |
|---|---|---|---|
| New York <Esc><br>With the highest room rates in the country, much you want to spend. There are some service or sunny views.<br>Picking a restaurant in New York City is a and blogs devoted to the quest, especially collective hunger.<br>Average hotel room rate: $275<br>Average restaurant rating: 2<br>⎫<br>⎬ 410<br>⎭ | New York<br>With the highest room rates in the country, much you want to spend. There are some service or sunny views.<br>Picking a restaurant in New York City is a and blogs devoted to the quest, especially collective hunger.<br>Average hotel room rate: $275<br>Average restaurant rating: 2 ⎫⎬420<br>*Hotel for 10/1/2008<br>  >Hilton <Esc><br>    There are 13 hotels listed. ⎤435 | New York<br>With the highest room rates in the country, much you want to spend. There are some service or sunny views.<br>Picking a restaurant in New York City is a and blogs devoted to the quest, especially collective hunger.<br>Average hotel room rate: $275<br>Average restaurant rating: 2<br>*Hotel for 10/1/2008<br>  >Hilton<br>    There are 13 hotels listed.<br>    avg, min room rate<br>    Average room rate: $399<br>    Minimum room rate: $269<br>  hotel with min room rate <Esc><br>    Millenium Hilton, 55 Church Street ⎤440 ⎤430 | New York<br>With the highest room rates in the country, much you want to spend. There are some service or sunny views.<br>Picking a restaurant in New York City is a and blogs devoted to the quest, especially collective hunger.<br>Average hotel room rate: $275<br>Average restaurant rating: 2<br>*Hotel for 10/1/2008<br>  >Hilton<br>    There are 13 hotels listed.<br>    avg, min room rate<br>    Average room rate: $399<br>    Minimum room rate: $269<br>  hotel with min room rate<br>    Millenium Hilton, 55 Church Street<br>  >Marriott <Esc><br>    There are 9 hotels listed.<br>    Average room rate: $359<br>    Minimum room rate: $280<br>  Hotel with minimum room rate: Courtya |

```
*Hotel for 10/1/2008
  >Hilton
  There are 13 hotels listed.
  avg, min room rate
  Average room rate: $399
  Minimum room rate: $269
  hotel with min room rate
  Millenium Hilton, 55 Church Street
     number <Esc>                                    ← 510
     Phone: (212)693-2001, Fax: (212)571-2316
  >Marriott
  There are 9 hotels listed.
     Average room rate: $359
     Minimum room rate: $280
     Hotel with minimum room rate: Courtyard New York Manhattan/Upper East Side,
        Phone: (212)410-6777, Fax: (212)423-1236
```

FIG. 7

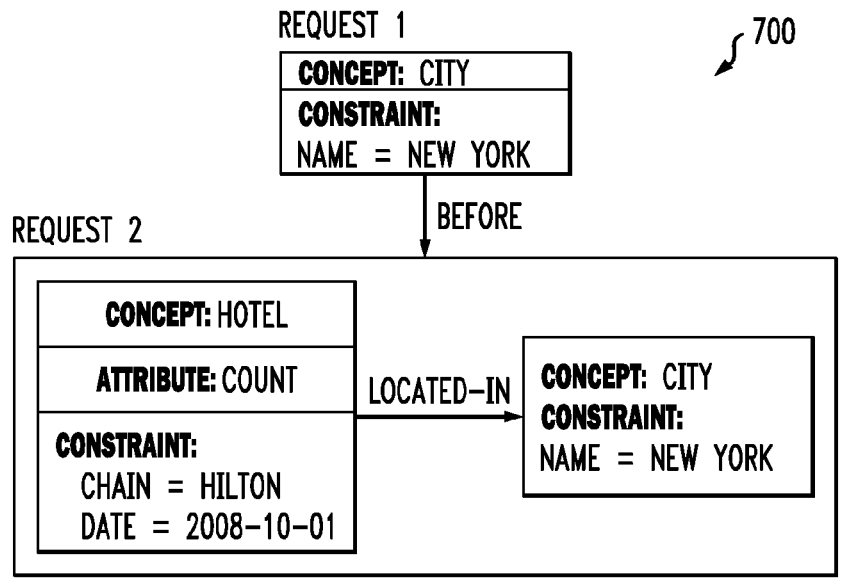

FIG. 8

| NOTATION | MEANING | EXAMPLE |
|---|---|---|
| * | DATA CONCEPT DEFINITION | *Restaurant |
| > | DATA CONSTRAINT DEFINITION | >Italian |
| \ | A NEW, STAND-ALONE INPUT | \San Francisco hotels |
| ? | RETRIEVAL OF SPECIFIC DATA VALUE | ?rating |
| # | COMMENTS, TO BE EXCLUDED | # My comments |
| , | DELIMITER DELINEATES NOTES ITEMS | name, address |
| [] | DELIMITER DEFINES A BLOCK OF NOTES | [*Hotel >Hilton] |
| TAB OR - | DELIMITER FOR INDENTATIONS | - min room rate |

FIG. 9

| OPERATOR | DESCRIPTION |
|---|---|
| ADD-LINK($R_1$, $R_2$) | LINK TWO NODES IN REQUESTS $R_1$ AND $R_2$ IF THERE EXISTS A SEMANTIC RELATIONSHIP IN THE ONTOLOGY TO LINK THE TWO NODES (e.g., HOTEL LOCATED-IN CITY) |
| ADD-PART($R_1$, $R_2$) | ATTACH A DATA CONSTRAINT OR DATA ATTRIBUTE DEFINED IN $R_2$ TO RELEVANT DATA CONCEPTS IN $R_1$ (e.g., ATTACHING roomRate ATTRIBUTE TO HOTEL CONCEPT). |
| UPDATE-PART($R_1$, $R_2$) | USE THE DATA CONSTRAINT OR DATA ATTRIBUTE DEFINED IN $R_2$ TO UPDATE RELEVANT ITEMS IN $R_1$. |
| REMOVE-PART($R_1$, $R_2$) | USE THE DATA CONSTRAINT (e.g., CHAIN=ANY) DEFINED IN $R_2$ TO REMOVE THE RELEVANT ONE (e.g., CHAIN="HILTON") IN $R_1$. |

FIG. 10

(a)
```
*RESTAURANT
 >AMERICAN
  >SERVING LUNCH, RATING >= 2
   THERE ARE 53 RESTAURANTS LISTED.
  >RATING <=3 <ESC>
   THERE ARE 50 RESTAURANTS LISTED.
```

(b)
```
*RESTAURANT
 >AMERICAN
  >SERVING LUNCH, RATING >= 2
   THERE ARE 53 RESTAURANTS LISTED.
  >RATING <=3 <ESC>
   THERE ARE 41 RESTAURANTS LISTED.
```

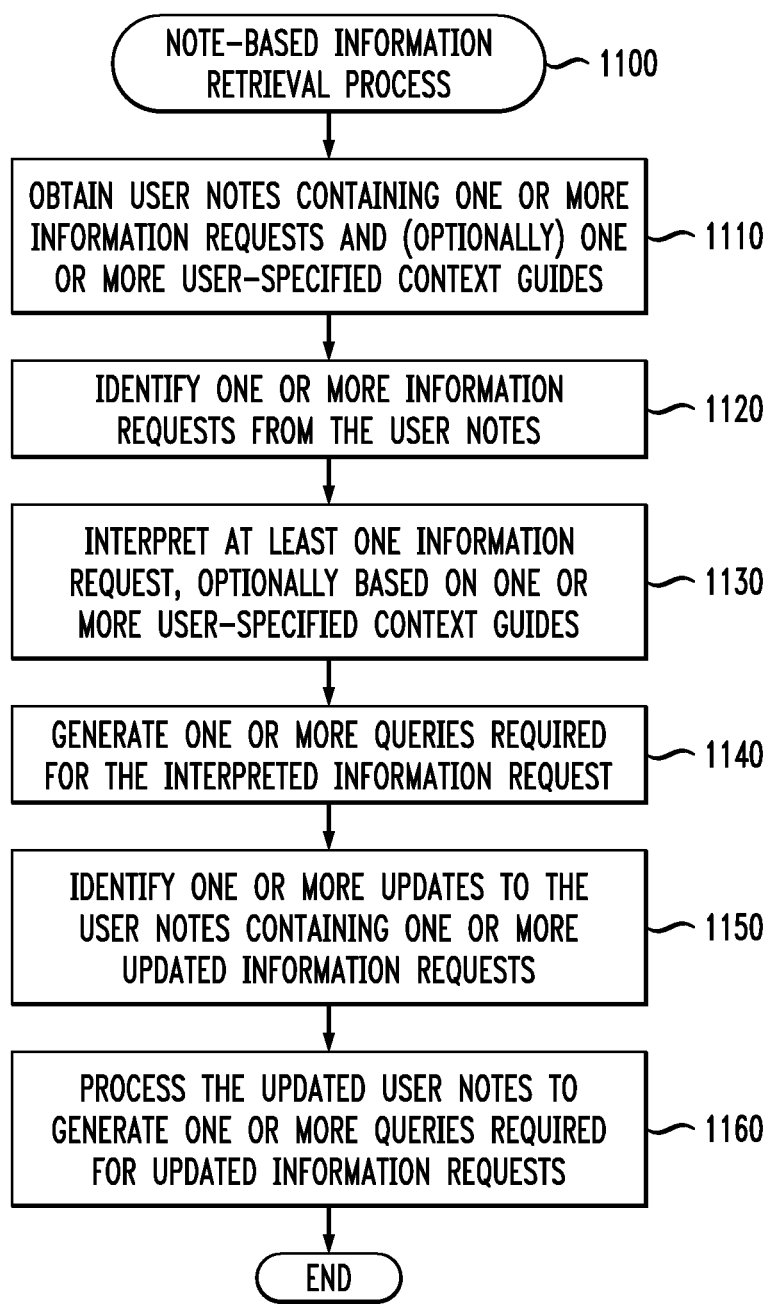

METHODS AND APPARATUS FOR CONTEXT-SENSITIVE INFORMATION RETRIEVAL BASED ON INTERACTIVE USER NOTES

FIELD OF THE INVENTION

The present invention relates to information retrieval systems and, more particularly, to information retrieval systems and methods based on interactive user notes.

BACKGROUND OF THE INVENTION

People constantly seek information for work and everyday life, for example, looking for carriers to ship company goods or searching for vacation destinations. Information seeking, however, can often be time consuming and difficult for several reasons. First, a complex information seeking task often requires multiple pieces of information about different but related entities and aspects. Because today's information retrieval systems are largely designed to process one search query at a time, a user may have to manually craft multiple queries to express his or her information needs, issue them one by one for retrieval, and manually aggregate information gathered at different steps. Second, during information seeking, a user may need to revisit one or more previously issued search requests and modify them in order to satisfy his or her evolving information needs. Without system support for easily revising an earlier search request in context, he or she may have to start over again. Third, a new or modified search request may change the context of previous searches and trigger the need to update corresponding results. Since few existing information retrieval systems automatically re-evaluate past requests and provide updates, a user may have to perform manual updates for earlier searches.

Due to the lack of support by information retrieval systems for complex information seeking tasks, people typically use text editing or word processing applications for taking notes of search requests and relevant results to aid information seeking. Since note-taking applications are not capable of directly retrieving information based on notes, however, a user may have to constantly switch back and forth between information retrieval systems and note-taking applications during information seeking, which may further increase the amount of time and effort required for accomplishing a task.

A need therefore exists for an information system that integrates the functionalities of information retrieval and note-taking to better assist users in information seeking.

SUMMARY OF THE INVENTION

Generally, information retrieval systems and methods are provided based on interactive user notes. According to one aspect of the invention, information is retrieved from one or more data sources based on user notes by obtaining the user notes containing one or more information requests; identifying the one or more information requests from the user notes; interpreting at least one of the information requests in context; generating one or more queries required for the at least one interpreted information request; identifying an update to the user notes, the update containing one or more updated information requests; and processing the updated user notes to generate one or more queries required for the updated information requests.

According to another aspect of the invention, if user notes contain multiple information requests, the plurality of information requests are interpreted in context. In addition, at least one query is generated for each of the plurality of information requests.

According to yet another aspect of the invention, the disclosed adaptive user-centered retrieval system processes user notes containing information requests and user-specified context guides. The information requests are interpreted based on the user-specified context guides. The user-specified context guides comprise one or more of syntactic cues, a structure of said user notes, and a format of said user notes.

A more complete understanding of the present invention, as well as further features and advantages of the present invention, will be obtained by reference to the following detailed description and drawings.

BRIEF DESCRIPTION OF THE DRAWINGS

FIG. 2 illustrates an exemplary user interface that may be employed by the adaptive user-centered retrieval system of FIG. 3;

FIGS. 4(a) through 4(d) illustrate evolving notes of a user and the corresponding information retrieved by the adaptive user-centered retrieval system;

FIG. 7 is an aggregated graph that contains two sub-graphs, representing two information requests derived from the notes of FIG. 4(a) and FIG. 4(b), respectively, and the temporal relationship between them;

FIG. 8 is a table containing an exemplary set of shorthand notations that may be employed by a user to indicate their specific needs in notes;

FIG. 9 is a table that identifies an exemplary set of context integration operators employed by an illustrative embodiment of the adaptive user-centered retrieval system;

FIG. 10 shows a same piece of notes entered under two different note structures; and FIG. 11 is a flow chart describing an exemplary implementation of a note-based information retrieval process that incorporates features of the present invention.

DETAILED DESCRIPTION OF PREFERRED EMBODIMENTS

The present invention provides an adaptive user-centered retrieval system 300, discussed above in conjunction with FIG. 3. The exemplary adaptive user-centered retrieval system 300 aids users in their information seeking in two steps. First, the disclosed adaptive user-centered retrieval system 300 dynamically interprets a user's notes in context to infer the user's new and updated information needs. Second, the adaptive user-centered retrieval system 300 automatically generates proper system-executable queries to retrieve relevant information from one or more sources to satisfy the inferred needs.

Among other benefits, the disclosed adaptive user-centered retrieval system 300 allows users to specify their explicit or implicit information needs in context conveniently using a notepad without worrying about the underlying retrieval details. In addition, users can flexibly obtain one piece of information at a time or efficiently collect multiple pieces of information at once to satisfy one or more information needs. The system also provides users a natural and easy way to keep track of their searches and results with notes. Furthermore, users can easily modify any part of their notes in context to obtain new/updated information, since the disclosed adaptive user-centered retrieval system 300 automatically re-evaluates previous searches in changing context and adaptively retrieves desired information to satisfy users' evolving information needs.

To enable said benefits, an adaptive user-centered retrieval system 300 faces two main challenges. First, a user's notes are usually in a form of informal natural language fragments. It is a challenge to accurately interpret the meanings of such input. Moreover, a user's notes may lump together multiple search requests, which must be segmented to be fulfilled. For example, the notes of a user may indicate the need for multiple pieces of information such as restaurant name, address and phone number. To retrieve all the information, the system may need to generate multiple queries. This process becomes more challenging if the needed information is stored in different formats or to be gathered from multiple data sources (e.g., relational databases and text collections).

Figure 1:
FIG. 1 illustrates exemplary notes to gather restaurant information.

Second, notes are often context sensitive, which in turn requires the system to interpret a piece of notes in context to derive its full meaning. FIG. 1 illustrates exemplary user notes 100 for an example that gathers restaurant information. As shown at line 4 in FIG. 1, for example, the word "name" implies the need of name information for Italian restaurants near IBM Hawthorne. To retrieve the needed information, the system must combine other parts of the notes, such as lines 1-3 of FIG. 1, to formulate the correct query.

According to one aspect of the invention, the disclosed adaptive user-centered retrieval system 300 provides dynamic, context-sensitive note interpretation. As discussed hereinafter, the disclosed adaptive user-centered retrieval system 300 uses a semantics-based approach to model and interpret user notes in context. The result of the interpretation is a set of information requests.

According to another aspect of the invention, the disclosed adaptive user-centered retrieval system 300 provides automatic query generation. Based on the derived information requests, the disclosed adaptive user-centered retrieval system 300 uses a hybrid of rule-based and procedural approaches to automatically generate queries. The exemplary adaptive user-centered retrieval system 300 can generate both SQL and keyword-based queries.

FIG. 2 illustrates an exemplary user interface 200 that may be employed by the disclosed adaptive user-centered retrieval system 300. As shown in FIG. 2, the exemplary adaptive user-centered retrieval system 300 provides users with three main interaction areas: a task bar 210, a note area 220, a result area 230. The task bar hosts a set of controls and a search box. The controls allow a user to create a new note file, load notes from a file, or save the current notes into a file. The search box lets a user directly enter a query in keywords or natural language phrases. Once submitted, the input entered in the search box is processed as a piece of stand-alone notes.

The note area 220 allows users to interactively enter their notes. The exemplary note area 220 supports the primary editing operations of a typical text editor, such as text insertion, deletion, copying and pasting. Users can enter their notes in the form of natural language fragments, including phrases, keywords, and text lists. At any time during the composition of notes, a user can instruct the adaptive user-centered retrieval system 300 to retrieve the needed information based on the notes that have been entered. The user can incrementally obtain information as additional information is added to the notes. Alternatively, the user can also input a batch of notes to collect all the needed information at once.

The adaptive user-centered retrieval system 300 can automatically insert the retrieval results in the note area 220 below the user-entered notes that request these results. Alternatively, the adaptive user-centered retrieval system 300 can present the results to users differently depending on the retrieval results. FIG. 2 illustrates the second approach. If a single data item is retrieved for a query (e.g., the average hotel room rate of a city), the adaptive user-centered retrieval system 300 inserts the item at the proper location in the note area 220 (e.g., below the user-entered notes). If multiple data items are retrieved for a query, the adaptive user-centered retrieval system 300 inserts the count information in the note area 220 but displays the results in the result area 230. The exemplary result area 230 has two tabbed sub-areas 240, 241. Under a "Current" tab 240, the result area 230 displays the most recent retrieval results and the corresponding queries generated by the adaptive user-centered retrieval system 300. The "History" sub-area 241 lists all previous retrieval results and queries over the course of user interaction. The displayed information of the note area 220 and that of the result area 230 are coordinated so that when a user highlights a piece of information in one area, the corresponding information in the other area is automatically highlighted.

A user can select one or more data items displayed in the result area 230 and insert them into the note area 220. A user can modify any part of the notes at any time, including the system-supplied content. For the sake of efficiency and effectiveness, the exemplary adaptive user-centered retrieval system 300 performs information retrieval only when a user explicitly requests it (e.g., by pressing an Esc key in the note area 220, as illustrated in FIG. 4, or submitting a query using the search box 210). This gives users the full control of deciding when the system's help is needed. As a result, users would not be interrupted arbitrarily during their note composition.

Figure 3:
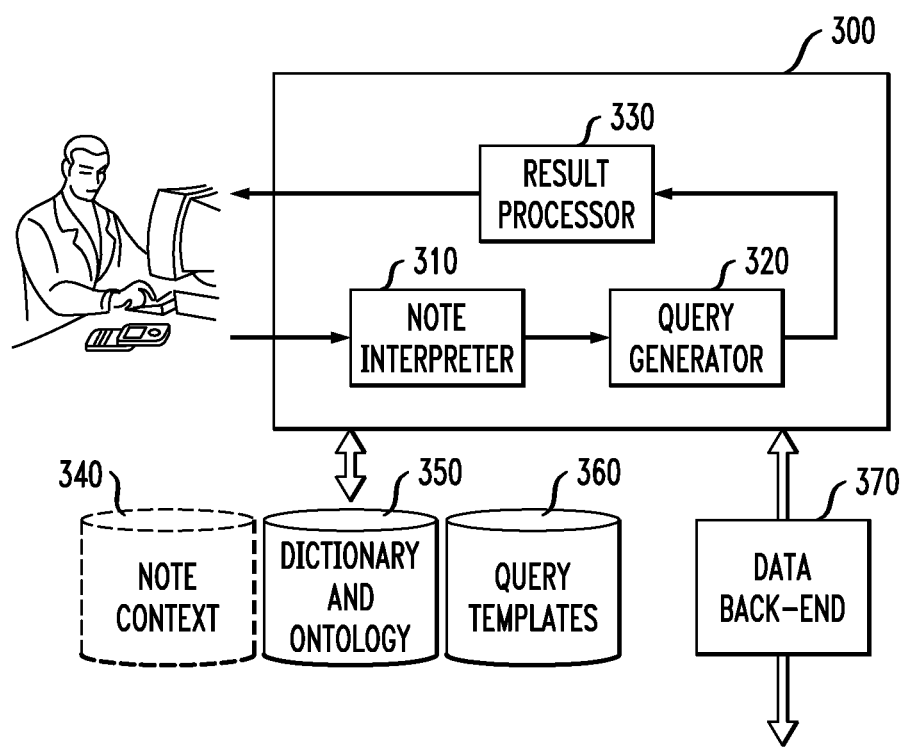
FIG. 3 is a schematic block diagram of an exemplary adaptive user-centered retrieval system 300 incorporating features of the present invention.

FIG. 3 is a schematic block diagram of an exemplary adaptive user-centered retrieval system 300 incorporating features of the present invention. The exemplary adaptive user-centered retrieval system 300 comprises a note interpreter module 310, a query generator module 320, and a result processor module 330.

Generally, a user starts by entering his or her notes in the note area 220 or typing an explicit query in the search box 210. Once the user instructs the adaptive user-centered retrieval system 300 to retrieve the needed information (e.g., pressing the Esc key after entering a piece of notes), the note interpreter 310 processes the user input and derives the semantics of the input in context. In the exemplary adaptive user-centered retrieval system 300, the semantics of user input is represented as a list of information requests that encode the user's information needs. Based on the derived information requests, the query generator 320 then generates system-executable queries. After the queries are executed, the retrieval results are passed to the result processor 330 for post processing. Depending on the retrieval results, the result processor 330 may further filter the results (e.g., extracting text snippets from text retrieval results), or remove redundant items. Finally, the processed results are displayed to the user.

As shown in FIG. 3, the exemplary adaptive user-centered retrieval system 300 maintains a set of knowledge sources to help interpret user notes and generate queries. They include a note context model 340 that may be dynamically updated during a user's note-driven information seeking process, a domain-specific data ontology and a dictionary 350 for analyzing note content, and a collection of format-specific but domain-independent query templates 360 for generating system-executable queries. The adaptive user-centered retrieval system 300 is also connected to an application data back-end 370 via a database server or a search engine.

EXAMPLE SCENARIOS

In this section, a set of concrete examples are used in the hospitality domain to illustrate how the adaptive user-centered retrieval system 300 aids users in using interactive notes for information seeking. FIGS. 4a through 4d provide exemplary evolving notes of a user and the corresponding information that is retrieved by the exemplary adaptive user-centered retrieval system 300 (shown in Italic face to distinguish from user input).

A. Translating Informal Notes to Data Queries

As previously indicated, the disclosed adaptive user-centered retrieval system 300 supports a natural note-taking experience, where users can specify their information needs in informal natural language fragments, including keywords, phrases and text lists. Consider a salesperson named Alison who is collecting hotel and restaurant information of New York City for her upcoming business trip. Using the adaptive user-centered retrieval system 300 to explore hospitality data, she starts by entering the city name in the note area (FIG. 4a), and presses the Esc key to instruct the adaptive user-centered retrieval system 300 to retrieve the relevant information.

Upon Alison's request, the adaptive user-centered retrieval system 300 processes her input and automatically formulates queries to retrieve the requested information 410 from available data sources, in this case, a collection of travel and tourism articles and a database of hotel and restaurant listings. The exemplary adaptive user-centered retrieval system 300 formulates two keyword-based queries to retrieve relevant snippets about hotels and restaurants in New York City. It also formulates two SQL queries to obtain key aspects of city information in terms of its hotels and restaurants, such as average hotel room rate and average restaurant rating, from the database.

B. Interpreting Notes in Context

Users may enter new notes in the context of existing notes, in a similar manner to taking notes on paper. Assume that Alison wants to see Hilton chain hotels in New York City for her date of travel. She expresses this in her new input 420 (FIG. 4b). Here, shorthand notations such as "*" and ">" are used to define specific information types. For example, "*" in "*Hotel" helps to define a data concept (Hotel); and ">" in ">Hilton" denotes a data constraint (Hilton chain hotels). Although not necessary, the use of shorthand notations may optionally help reduce ambiguity in note input and hence may further improve the accuracy of note interpretation.

Note that Alison's new input by itself represents an incomplete information request ("Hilton chain hotels"). The adaptive user-centered retrieval system 300 thus uses the entire notes entered so far to derive the intended request ("Hilton chain hotels in New York City on Oct. 1, 2008"). As a result, thirteen hotels are retrieved. Since this request brings back multiple (13) data items, the exemplary adaptive user-centered retrieval system 300 displays only the hotel count in the note area 220 but keeps the full hotel listings in the result area 230 for Alison to examine.

By default, the exemplary adaptive user-centered retrieval system 300 interprets a piece of notes in the context of existing notes. However, users can explicitly indicate the applicable context when entering a piece of notes. In an exemplary embodiment, a user can use indentations to indicate the indented notes to be interpreted in the context of all its ancestors. For example, entry 430 ("hotel with min room rate") is interpreted in the context of "Hilton chain hotels in New York City on Oct. 1, 2008" (FIG. 4c).

C. Identifying Multiple Information Requests

Unlike issuing an explicit query, a user may use a single note to express multiple information requests at once. Suppose that Alison wants the average and minimal room rates of Hilton chain hotels in New York City. Alison can lump together the two requests (i.e., average and minimal room rates) in a brief note 435 "avg, min room rate" (FIG. 4c). Accordingly, the adaptive user-centered retrieval system 300 builds two queries to retrieve the requested information.

In addition to identifying explicitly information requests specified by a user, the adaptive user-centered retrieval system 300 can also infer implicit information requests. After examining Hilton chain hotels in New York City, assume that Alison now enters a note 440 to see Marriott chain hotels in New York City (FIG. 4d). Based on the entire notes entered so far, the adaptive user-centered retrieval system 300 infers that Alison would want the same type of information for Marriott chain hotels as for Hilton chain hotels. Accordingly, the exemplary adaptive user-centered retrieval system 300 identifies four information requests to retrieve the corresponding hotel count, the average and minimal room rates, and the hotel with the minimal room rate, respectively.

D. Handling Note Update

At any given time, a user can edit any part of the existing notes to indicate his or her changing information needs. Accordingly, the adaptive user-centered retrieval system 300 automatically retrieves new information based on the updated notes. Suppose that after seeing New York hotels (FIG. 4d), Alison now wants to examine hotels located in a nearby city, such as White Plains. To do so, Alison simply replaces "New York" with "White Plains" and presses the Esc key. As a result, the adaptive user-centered retrieval system 300 automatically re-evaluates all the note input appearing below the replacement and retrieves a new set of hotel information.

Figures 5, 6:
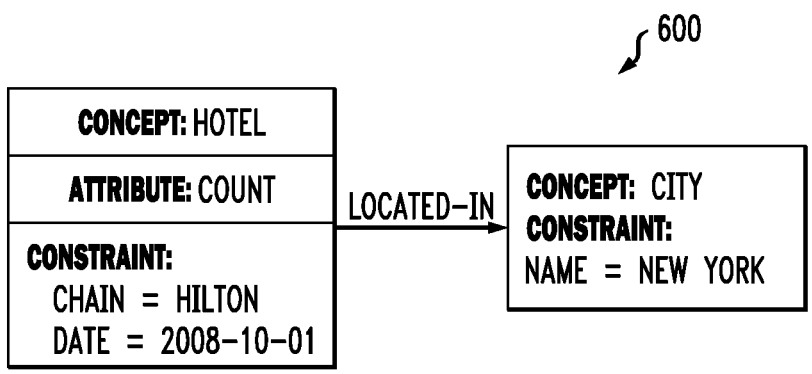
FIG. 5 illustrates a further update to the user notes of FIGS. 4(a) through 4(d)
FIG. 6 shows an example of the representation for an information request derived from the notes of FIG. 4(b)

The above example shows that Alison can easily manipulate her existing notes to satisfy her changing information needs. In addition, Alison can insert new input in the middle of existing notes. Suppose that Alison wants to retrieve the contact information for Hilton or Marriott hotels with the minimal room rates. She inserts "number" in a note 510 under the Hilton block (FIG. 5). Given this input, the adaptive user-centered retrieval system 300 retrieves the requested information for the Hilton hotel with the minimal room rate. It also automatically re-interprets all the existing notes below the insertion point, since the new input may have altered the previous interpretation of such notes. Specifically, the exemplary adaptive user-centered retrieval system 300 re-processes ">Marriott" in the following note in the context of new input. As a result, the exemplary adaptive user-centered retrieval system 300 retrieves the contact information for the Marriott hotel with the minimal room rate as well (FIG. 5). Here, the word "number" is ambiguous, since it may refer to the phone number or the fax number. In this example, the adaptive user-centered retrieval system 300 formulates two queries to retrieve both numbers.

Note Interpretation

As described above, a user's notes imply his or her information needs. To identify and satisfy such information needs, the adaptive user-centered retrieval system 300 dynamically interprets the user's notes in context and then generates corresponding queries to retrieve the desired information. In this section, the manner in which the adaptive user-centered retrieval system 300 interprets a user's notes to infer his or her information needs is described in two steps. First, a graph-based representation is introduced for modeling a user's information needs. Second, it is shown how the adaptive user-centered retrieval system 300 dynamically interprets a user's notes in context to build such a graph-based structure.

A. Representing a User's Information Needs

Given a user's note input, the exemplary adaptive user-centered retrieval system 300 models a user's information needs from two aspects. First, an information request is defined that denotes the semantics of a specific piece of information to be retrieved. Second, a note context is modeled that is an aggregation of all information requests derived from a user's notes.

a. Representing an Information Request

In one exemplary implementation, the information to be encoded in a single information request can be limited so that one information request can normally be satisfied by a single query, discussed below in the section entitled "Automatic Query Generation." An information request can specify, for example: (1) a data set of the same concept with/without constraints (e.g., a hotel set), (2) a single data attribute of a data set defined by (1) (e.g., room rates of a hotel set), or (3) information relevant to a single data concept with/without constraints (e.g., hotel information of New York City). While information for types 1 and 2 can be obtained by database queries, type 3 information is usually retrieved by keyword-based queries, as discussed further below. With regard to type 1, the adaptive user-centered retrieval system 300 can encode multiple data attributes of the same data set in an information request, while still generating a single query to satisfy such a request. However, when aggregated attributes (e.g., min and max room rates) are involved, it becomes more complex.

A graph-based model is used to represent an information request. FIG. 6 shows an example of such representation for an information request derived from the user notes of FIG. 4b. The graph 600 of FIG. 6 consists of a set of nodes and links. Each node represents a data concept (e.g., Hotel), and each link encodes the semantic relationship between two concepts (e.g., Hotel located-in City). In addition, a node may contain a set of data attributes (e.g., roomRate) and data constraints (e.g., chain=Hilton). A data attribute could be an aggregated attribute, which includes an aggregation operator and a data attribute, like min(roomRate). A data constraint consists of an operator (e.g., EQ) and a set of operands. An operand can be a data concept, a data attribute, or a constant value.

Each information request has an anchor node that defines the type of information to be retrieved. For example, the Hotel is the anchor node in FIG. 6, requesting the relevant hotel count to be retrieved. The retrieval results of an information request are stored in the request's representation as well. Each information request is also associated with a set of features. The exemplary adaptive user-centered retrieval system 300 uses three features: input-location, indentation-level, and data-source. Feature input-location records the location of the notes from which the request is derived. Feature indentation-level indicates the level of indentation of the notes from which the request is inferred. The values of these two features are dynamically derived during note processing. The adaptive user-centered retrieval system 300 uses these two features to determine the context of an information request (see the Section entitled "Deriving Information Requests in Context"). Finally, feature data-source indicates which data sources may be used to satisfy the request. This feature is determined during the query generation stage (see the Section entitled "Automatic Query Generation").

b. Representing a Note Context

As described above, a user may enter notes in the context of previous notes. Moreover, a user's notes may imply multiple information requests. An aggregated graph is thus used to represent all information requests derived from a user's notes. FIG. 7 is an aggregated graph 700 that contains two sub-graphs, representing two derived information requests: 1) New York City, and 2) Hilton chain hotels in New York City on Oct. 1, 2008. Here, the first request (Request 1) is derived earlier based on the user notes entered in FIG. 4(a). Using Request 1 as the context, the adaptive user-centered retrieval system 300 derives Request 2 given the new input in FIG. 4(b). The two requests are also linked together by their temporal relationship ("before" indicates that Request 1 (FIG. 4a) occurred before Request 2 (FIG. 4b)). This aggregated graph 700 will serve as the context to interpret future note input (e.g., input in FIG. 4c).

B. Deriving Information Requests in Context

To interpret a user's note input, one embodiment of the adaptive user-centered retrieval system 300 adopts a semantics-based approach to natural language query interpretation. See, M. Zhou et al., "Enabling Context-Sensitive Information Seeking," Proc. IUI '06, 112-23 (2006). However, the approach has been extended to accommodate the unique characteristics of user note input in an interactive information seeking process.

First, the natural language input processing algorithm, which handles only one user query (request) at a time, is augmented to derive multiple information requests implied by a user's notes. Second, its context integration algorithm (K. Houck, "Contextual Revision in Information-Seeking Conversation Systems," Proc. of the Twelfth International Conference on Spoken Language Processing, 201-04 (2004) is improved to exploit unique characteristics of note input, such as note location and structure. As a result, the extended work can effectively interpret a user's notes in context. Third, the adaptive user-centered retrieval system 300 also automatically re-interprets existing notes based on new user input. As a result, the adaptive user-centered retrieval system 300 can adaptively retrieve relevant information to meet the user's evolving information needs.

a. Deriving One or More Information Requests

As indicated above, the adaptive user-centered retrieval system 300 can derive multiple information requests from a user's note input. Upon a user's request for information (i.e., pressing the Esc key), the exemplary adaptive user-centered retrieval system 300 first identifies the current input block, a block of notes to be used for specifying the user's current information needs. If the user has never requested information before, the input is the entire user notes entered so far. Otherwise, the input block starts with the top-most, unprocessed notes. It ends where the cursor is when the user presses the Esc key. In FIG. 4(b), the input block starts with "*Hotel" and ends with ">Hilton". After identifying the input block, the adaptive user-centered retrieval system 300 aggregates all the text in the block into one big string. In FIG. 4(b), the aggregated string is "*Hotel for Oct. 1, 2008>Hilton". Instead of letting the adaptive user-centered retrieval system 300 infer an input block, users can also highlight a block of notes to explicitly indicate the current input.

Given the string, the adaptive user-centered retrieval system 300 uses a natural language input processing algorithm (M. Zhou et al., "Enabling Context-Sensitive Information Seeking," Proc. IUI '06, 112-23 (2006)) to identify a set of semantic elements from the input, including data concepts (e.g., Hotel), data attributes, and data constraints. The adaptive user-centered retrieval system 300 also infers the semantic relationships between the elements, e.g., the relationship between two data concepts such as Hotel located-in City. The algorithm works well if the input block specifies only a single information request, since the approach was originally designed to handle one user query at a time. However, a user's notes may imply multiple information requests. The existing algorithm is augmented to identify and segment multiple information requests specified in a user's note input.

The adaptive user-centered retrieval system 300 first exploits syntactic cues existing in a user's notes, such as common delimiters, shorthand notations and indentations, to detect the existence of multiple information requests. FIG. 8 is a table 800 containing an exemplary set of shorthand notations that may be employed by a user to indicate their specific needs. A user can also explicitly indicate the intended structure of his or her notes. For example, a user can use indentations to outline parent-child and sibling relationships among a set of note elements. These notations and structural indications let users explicitly and unambiguously express their intentions in the notes. More importantly, these syntactic cues allow the adaptive user-centered retrieval system 300 to effectively identify user information requests implied by the note input.

Specifically, based on the structure of the notes, especially indentations, the exemplary adaptive user-centered retrieval system 300 automatically separates the siblings into individual requests. In FIG. 4(*c*), for example, the siblings "avg, min room rate" and "hotel with min room rate" would form separate information requests. The exemplary adaptive user-centered retrieval system 300 further checks whether delimiters like commas exist in the input. If delimiters are found, the adaptive user-centered retrieval system 300 divides the input into multiple parts by the delimiters when appropriate. Depending on the semantics of the input, the adaptive user-centered retrieval system 300 may not always decompose a piece of input into multiple pieces. For example, in constraint ">Italian, rating>=4", the delimiter can be ignored, since it represents the "AND" of multiple restaurant constraints. For example, the input "name, address, phone number" at line 4 in FIG. 1 is broken into three parts "name", "address", and "phone number." Each part can then be processed separately.

It has been found that the above methods work reliably except in two cases where additional semantic information may be required to correctly identify multiple information requests.

The first case is where a user's input is abbreviated. For example, the input "avg, min room rate" implies two information requests: retrieving the average and minimal room rates. If the adaptive user-centered retrieval system 300 used only syntactic cues (i.e., comma) to segment this input, it would produce undesired segmentations (i.e., "avg" and "min room rate"). To handle such cases, the adaptive user-centered retrieval system 300 uses a set of rules. For example, one exemplary rule states that if there are multiple aggregation operators (e.g., avg and min), then each of the resulted segments should contain an aggregation operator and a data attribute. By this rule, the adaptive user-centered retrieval system 300 can correctly parse the input "avg, min room rate" into two pieces: "avg room rate" and "min room rate".

The second case is where a note input is ambiguous. For example, the term "number" in FIG. 5 is ambiguous, since it may refer, for example, to the telephone number or the fax number. To handle these cases, the exemplary adaptive user-centered retrieval system 300 relies on a set of rules to automatically generate multiple information requests based on the nature of ambiguities. For example, one exemplary rule states that if an input (e.g., "number") implies multiple data attributes, then multiple information requests should be created for retrieving each of the identified attributes (e.g., "phoneNumber" and "faxNumber").

b. Deriving a Full Information Request in Context

As shown in FIG. 4, a user's notes are often provided in context. Accordingly, the current input block identified by the adaptive user-centered retrieval system 300 may contain only partial information. For example, the input block 420 identified in FIG. 4(*b*) corresponds to an incomplete information request ("Hilton chain hotels on Oct. 1, 2008"). To derive a full information request (e.g., "Hilton chain hotels in New York City on Oct. 1, 2008"), the exemplary adaptive user-centered retrieval system 300 should integrate the interpretation of the current input with the existing note context. The context integration is performed in two steps: identifying integration candidates and determining integration operations.

i. Identifying Integration Candidates

Context integration candidates are information requests derived previously that can be used to help interpret the current input. By default, all information requests stored in a note context are potential candidates. FIG. 7 shows two candidates: Request 1 and Request 2. To narrow down the candidate list, the exemplary adaptive user-centered retrieval system 300 uses note structure to find suitable candidates. The note structure, such as parent-child relationship between note items, naturally defines the context scope during which a piece of user input should be interpreted. Based on the note structure, the adaptive user-centered retrieval system 300 currently uses two heuristics to look for two specific types of candidates.

The first heuristic looks for candidates (information requests) that correspond to the parent of the current input so that the adaptive user-centered retrieval system 300 can interpret the input in the context of its parent. In the case of FIG. 4(*d*), the current input is ">Marriott". By the note structure, its parent is "*Hotel for Oct. 1, 2008". Accordingly, the adaptive user-centered retrieval system 300 looks for the context-sensitive information request derived from "*Hotel for Oct. 1, 2008".

The second heuristic is to search for candidates (information requests) corresponding to the siblings of the current input so that the adaptive user-centered retrieval system 300 can interpret the input in the context of its siblings and their descendents. In the case of having multiple siblings, one implementation of the adaptive user-centered retrieval system 300 considers only the sibling that is located right above the current input. In FIG. 4(*d*), ">Hilton" is the sibling of the current input ">Marriott". The exemplary adaptive user-centered retrieval system 300 thus searches for the information requests derived from the input ">Hilton" and its descendents.

ii. Determining Integration Operations

Once integration candidates are identified, the adaptive user-centered retrieval system 300 selects appropriate context integration operators to merge the current information requests with the integration candidates. FIG. 9 is a table 900 that identifies an exemplary set of context integration operators employed by an illustrative embodiment of the adaptive user-centered retrieval system 300. As shown in FIG. 9, the exemplary context integration operators use both semantic information (e.g., data ontology) and note structure to decide which operator to use. Similar to the operator selection process described in Houck, "Contextual Revision in Information-Seeking Conversation Systems," Proc. of the Twelfth International Conference on Spoken Language Processing, 201-04 (2004), semantic information can be used to check whether the semantic types of the information requests match with those of an operator. For example, the add-link operator requires two different data concepts. In addition, the exemplary adaptive user-centered retrieval system 300 uses note structure to select an integration operator. By default, the adaptive user-centered retrieval system 300 selects an add-part operator based on a parent-child relation, while choosing an update-part operator based on a sibling relation. In complex cases as shown below, the adaptive user-centered retrieval system 300 may use semantic information and note structure together to determine the integration operations.

FIG. 10 shows a same piece of notes entered under two different note structures. In FIG. 10(a), by the note structure itself, the adaptive user-centered retrieval system 300 would use the new input "rating<=3" to replace (update-part) its sibling "serving lunch, rating>=2". In contrast, in FIG. 10(b), by the note structure alone, the adaptive user-centered retrieval system 300 would add (add-part) the new input "rating<=3" to its parent "serving lunch, rating>=2". However, the parent already contains a rating constraint ("rating>=2"). Using both the semantic information (i.e., the existence of same type of constraints) and the note structure, the exemplary adaptive user-centered retrieval system 300 now would use an update-part operator to merge the two constraints of the same type. During an update operation, the new constraint completely replaces the existing one if conflicts arise. Using the above example, if the existing rating constraint were "rating=4", it would then be replaced by the new one ("rating<=3").

c. Adaptively Deriving New Information Requests

During interactive note-driven information seeking, a user may dynamically update his or her notes (e.g., modification of existing notes or insertion of new notes) to express his or her evolving information needs. Depending on where such changes occur, it may require the re-interpretation of the unchanged, existing notes. For example, when "number" is inserted (FIG. 5), the note context that was used to interpret the input ">Marriott" is also changed. To adapt to the updated context, ">Marriott" must be re-interpreted to fulfill the user's changing needs.

To do so, the adaptive user-centered retrieval system 300 first processes the user's new input to derive its corresponding information requests. The derived information requests are automatically inserted in the existing note context. Given the new input in FIG. 5, two information requests are derived: "phone number and fax number of Hilton hotel with minimal room rate in New York City on Oct. 1, 2008". Accordingly, the note context is updated to contain these two requests. By default, the adaptive user-centered retrieval system 300 always assumes that all the notes located below the new input are affected by the change. The affected items are then re-interpreted in light of the updated context. In the example of FIG. 5, the re-interpretation of the affected item ">Marriott" yields two new requests: "phone number and fax number of Marriott hotel with minimal room rate in New York City on Oct. 1, 2008". The adaptive user-centered retrieval system 300 then retrieves the relevant information to satisfy these requests.

Automatic Query Generation

Given an information request, the adaptive user-centered retrieval system 300 automatically generates one or more queries to satisfy the request (typically in three steps). First, the adaptive user-centered retrieval system 300 identifies the number of queries and data sources needed. Second, the adaptive user-centered retrieval system 300 determines query parameters of each query. Third, the adaptive user-centered retrieval system 300 automatically formulates system-executable queries based on the data source and query parameters determined in the first two steps.

A. Identifying Queries and Data Sources

As described above, the information contained in a single information request is typically limited. As a result, an information request can usually be fulfilled by a single query. However, the information specified in an information request may be stored in multiple data sources or in different formats. For example, in FIG. 4(a), the request for obtaining the information about New York City is stored in both a relational database and a collection of text articles. In such cases, multiple queries are needed to retrieve the desired information from respective sources.

To determine the number of queries needed for an information request, the adaptive user-centered retrieval system 300 estimates the likelihood of each data source containing the requested information. A database is likely to supply the desired information if its data schema includes the same data concepts and data attributes as those specified in the request (e.g., FIG. 6). For text collections, relevant terms are first extracted from the request. For example, the term "New York" is extracted from Request 1 in FIG. 7. The term's frequency in the text collection is then used to estimate the likelihood of having such a collection provide relevant information for the request. See, e.g., J. Xu and W. B. Croft. "Cluster-Based Language Models for Distributed Retrieval," Proc. ACM SIGIR '99, 254-61 (1999).

B. Determining Query Type and Parameters

After identifying the number of queries and data sources needed for fulfilling an information request, the adaptive user-centered retrieval system 300 then determines the query type and parameters for each query. One embodiment of the adaptive user-centered retrieval system 300 supports two types of queries: SQL queries to retrieve data from databases and keyword-based queries to retrieve information from text collections. Thus, the type of a query is easily determined by the data source used. If a data source supports multiple types of queries, then additional method is required to determine one or more query types for the data source.

To formulate and eventually execute a query, a query often requires a set of query parameters to be defined. Depending on the type of query, the set of parameters may be different. For example, a SQL query may require proper data attribute to be projected, while a keyword-based query may demand additional keywords to retrieve the most relevant information. Generally, an information request already contains all the information required to supply various query parameters. For example, the data concept and data constraints specified in an information request can be directly mapped to table name in FROM statement and conditions in WHERE clause, respectively. However, there are two cases where the exemplary adaptive user-centered retrieval system 300 must perform additional work to determine the needed query parameters.

a. Determining Parameters for SQL Query

One case is that where an information request does not explicitly specify the exact information to be retrieved. For example, the information request (Request 1 in FIG. 7) derived from the note input "New York" (FIG. 4a) does not provide the exact city attributes to be retrieved (i.e., nothing to project in the SQL query). To obtain the desired New York City information, the adaptive user-centered retrieval system 300 must decide proper data attributes to retrieve. One embodiment of the adaptive user-centered retrieval system 300 uses an optimization-based approach to data attribute selection (M. Zhou et al., "An Optimization-Based Approach to Dynamic Data Content Selection in Intelligent Multimedia Interfaces," Proc. UIST '04, 227-36 (2004)). Generally, this approach dynamically selects a sub-set of data attributes to retrieve by balancing a wide variety of selection criteria, including user preference, data properties (e.g., data quality), as well as the cost of retrieving and presenting such data attributes. In the case of above example, the adaptive user-centered retrieval system 300 selects the most common attributes of a city in the hospitality domain to retrieve, including the average hotel room rate and the average restaurant rating (FIG. 4a).

b. Determining Parameters for Keyword-Based Query

Similarly, an information request may be too vague to generate a meaningful keyword-based query for effective information retrieval. Using the same example mentioned above, if a keyword-based query contains only the term "New York", the adaptive user-centered retrieval system 300 could retrieve all the text sentences related to New York. Such retrieval results may overwhelm a user. To retrieve more relevant information, the adaptive user-centered retrieval system 300 can use two main methods to include additional keywords to enrich a keyword-based query (query expansion). First, it uses the semantic information encoded in an information request, such as data concepts and the relations between the data concepts, to generate additional keywords. In the above example, the adaptive user-centered retrieval system 300 includes keyword "Manhattan" for more effective information retrieval.

Second, the adaptive user-centered retrieval system 300 can use a similar approach to the one used for selecting the data attributes for SQL queries to include more meaningful keywords. Specifically, it first selects a sub-set of attributes as it does for a SQL query. The only difference is that it favors data attributes that are mentioned more frequently in the text collections. The adaptive user-centered retrieval system 300 then generates keywords for the selected data attributes. In the above example, the exemplary adaptive user-centered retrieval system 300 includes keywords like "hotel" and "restaurant" to retrieve specific information about New York City.

An implementation of the adaptive user-centered retrieval system 300 reversely utilizes its dictionary, which is used in the note interpretation (FIG. 3), to generate one or more keywords for expressing a data concept or data attribute.

C. Formulating Data Queries

After deciding the query type and parameters, the adaptive user-centered retrieval system 300 uses a set of domain-independent query templates to automatically formulate system-executable queries. Each query template describes the required query parameters and a procedural method that uses the parameters to formulate a data query for one type of data sources (e.g., databases vs. text collections). An implementation of the adaptive user-centered retrieval system 300 uses two query templates, one for generating a keyword-based query for Lucene to perform text retrieval, the other for generating a SQL query for an IBM DB2 server to retrieve information from a database.

The Lucene-based query template allows the use of Boolean operators to combine all generated keywords in a query. In the example mentioned above, it may generate a query like "((New York City) OR (Manhattan)) AND (hotel OR restaurant)". The DB2-based query template uses various query parameters, which may be directly extracted from an information request or determined by the adaptive user-centered retrieval system 300 (e.g., projection attributes mentioned above), to formulate various SQL fragments, mainly the SELECT and FROM statements and the WHERE clause. Due to the limitations of SQL itself, the use of nested SQL queries may be needed for fulfilling certain information requests, like "Italian restaurants on the same street as a Hilton hotel".

Note-Based Information Retrieval Process

FIG. 11 is a flow chart describing an exemplary implementation of a note-based information retrieval process 1100 that incorporates features of the present invention. As shown in FIG. 11, the exemplary implementation of a note-based information retrieval process 1100 initially obtains user notes during step 1110 containing one or more information requests and optionally one or more user-specified context guides. Thereafter, the exemplary note-based information retrieval process 1100 identifies one or more information requests from the user notes during step 1120. The information request is interpreted during step 1130, optionally based on one or more user-specified context guides. One or more queries required for the interpreted information request are generated during step 1140.

One or more updates to the original user notes are identified during step 1150 that contain one or more updated information requests. The updated user notes are then processed during step 1160 to generate one or more queries required for the updated information requests.

Miscellaneous Issues

A. System Portability

The adaptive user-centered retrieval system 300 uses various types of semantic information (e.g., data ontology) to interpret a user's notes. It has been found that it normally takes three main steps to port the exemplary adaptive user-centered retrieval system 300 to a new application.

First, a data ontology is defined to include the data concepts and data attributes specific to the application domain. In an exemplary implementation, an ontology is semi-automatically created based on database schemata. Data tables and columns are automatically mapped to data concepts and data attributes respectively. The relationships between data concepts are extracted either based on data table relations (e.g., foreign keys) or based on manual annotations. A "shallow" ontology was employed to avoid unnecessary complexity. Second, a dictionary was created that associates words/phrases with data elements in the ontology. The dictionary can also be semi-automatically populated by mining databases to extract the needed information (e.g., all columns and their respective values). Third, if the new application requires the use of unstructured data sources such as text documents, these data sources may need to be pre-processed (e.g., indexed or annotated).

Since both the ontology and dictionary are used as knowledge sources to interpret a user's input, the adaptive user-centered retrieval system 300 can handle a new ontology or dictionary without changing its interpretation algorithm. As a result, the adaptive user-centered retrieval system 300 can be extended to cover new data concepts and data attributes defined in an ontology or dictionary. In addition, the adaptive user-centered retrieval system 300 can be extended to cover new data sources or query languages by adding new query templates.

B. Exploiting Note Structure

Unlike ad hoc user input, a user's notes often have a certain structure. Although the exemplary adaptive user-centered retrieval system 300 has already used certain syntactic features (e.g., shorthand notations) to help interpret a user's notes, the adaptive user-centered retrieval system 300 can further exploit the note syntax especially its structural information. For example, a user may use brackets to indicate different note blocks, which naturally help the adaptive user-centered retrieval system 300 to segment different information requests without even using any semantic inference. Such syntactic information may also better help formulate keyword-based queries to unstructured data sources, as in these cases both the queries and retrieval results have little semantics. In addition, the use of syntactic cues in its note interpretation makes the adaptive user-centered retrieval system 300 more portable to different domains and applications.

C. Query Performance Optimization

As mentioned above, the information content can be limited to be specified in a single information request. The advantage of this approach is the simplification of query formulation. However, there is a potential impact on system performance especially in real-world applications where data volume is often huge (e.g., in terabytes). For example, now it would require two information requests to represent the retrieval of the minimal and maximal room rates of a hotel set, since each information request is allowed to retrieve a single data attribute. Accordingly, the adaptive user-centered retrieval system 300 would execute two SQL queries to retrieve the needed information. The performance impact would be evident if the underlying data set is massive. To rectify such situations, query optimization may be needed. In certain cases, the two queries may be merged into one query. However, in certain situations, it may be difficult to decide whether and how multiple queries can be combined. Assume that the above example requests the count and maximal price of the same hotel set. In this case, it would take significant work for the adaptive user-centered retrieval system 300 to determine the optimal number of queries needed to achieve the desired query performance.

CONCLUSION

While a number of figures show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

The adaptive user-centered retrieval system 300 comprises memory and a processor that can implement the processes of the present invention. Generally, the memory configures the processor to implement the note-driven information retrieval processes described herein. The memory could be distributed or local and the processor could be distributed or singular. The memory could be implemented as an electrical, magnetic or optical memory, or any combination of these or other types of storage devices. It should be noted that each distributed processor that makes up the processor generally contains its own addressable memory space. It should also be noted that some or all of adaptive user-centered retrieval system 300 can be incorporated into a personal computer, laptop computer, handheld computing device, application-specific circuit or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for retrieving information from one or more data sources based on user notes, comprising:
obtaining said user notes containing one or more information requests;
identifying said one or more information requests from said user notes using one or more of semantic rules, wherein said semantic rules identify a plurality of types of relations between two or more concepts to interpret said one or more information requests, wherein said semantic rules identify said information requests for automatic generation of one or more system-executable search queries applied to at least one external database;

interpreting at least one of said information requests in a context of said information request, wherein said context of said information request comprises information that constrains a scope of said information request;

generating said one or more system-executable search queries required for said at least one interpreted information requests;

identifying an update to said user notes, said update containing one or more updated information requests; and processing said updated user notes to generate one or more system-executable search queries required for said updated information requests, wherein one or more steps of said method are performed by one or more hardware devices.

2. The method of claim 1, wherein said step of identifying said one or more information requests further comprises the step of identifying multiple information requests from said user notes using one or more of syntactic cues, a structure of said user notes and a format of said user notes.

3. The method of claim 1, further comprising the step of interpreting said information requests in context to generate a semantic representation that encodes a meaning of said information requests.

4. The method of claim 3, further comprising the step of identifying a set of semantic elements from said information requests including one or more data concepts, data attributes and data constraints.

5. The method of claim 4, further comprising the step of inferring a semantic relationship between said set of semantic elements.

6. The method of claim 4, further comprising the step of generating a semantic representation of said information request to encode said semantic elements and semantic relationships.

7. The method of claim 6, wherein said semantic representation is a graph-based model.

8. The method of claim 7, wherein said graph-based model comprises an anchor node defining a type of information to be retrieved.

9. The method of claim 7, wherein each node in said graph-based model represents a data concept and contains one or more data attributes and one or more data constraints.

10. The method of claim 7, wherein each link in said graph-based model represents a semantic relationship between two of said data concepts.

11. The method of claim 3, further comprising the step of integrating a context of existing user notes with said semantic representation of a current information request.

12. The method of claim 11, wherein said context integration further comprises the steps of identifying context integration candidates from one or more previously derived information requests based on one or more of a semantics of said information requests and a structure of said user notes, and determining integration operations to merge said current information request with said context integration candidates.

13. The method of claim 1, wherein said generation of one or more system-executable search queries further comprises the step of determining query types and one or more query parameters for said one or more system-executable search queries that satisfy said information request.

14. The method of claim 13, further comprising the step of using a procedural method to formulate a query of a specific type for said information request using said one or more query parameters.

15. The method of claim 1, wherein one or more indentations in said user notes establish semantic links between one or more of:
one or more information terms; and
said one or more information requests.

16. The method of claim 1, wherein said one or more information requests are delineated by a symbol.

17. The method of claim 1, wherein said generating step is triggered by an escape operation.

18. A method for retrieving information from one or more data sources based on user notes, comprising:
obtaining said user notes containing a plurality of information requests;
identifying said plurality of information requests from said user notes using one or more semantic rules, wherein said semantic rules identify a plurality of types of relations between two or more concepts to interpret said one or more information requests, wherein said semantic rules identify said information requests for automatic generation of one or more system-executable search queries applied to at least one external database;
interpreting said plurality of said information requests in a context of said information request, wherein said context of said information request comprises information that constrains a scope of said information request; and
generating said one or more system-executable search queries for each of said plurality of interpreted information requests, wherein one or more steps of said method are performed by one or more hardware devices.

19. The method of claim 18, wherein said step of identifying said plurality of information requests further comprises the step of identifying multiple information requests from said user notes using one or more of syntactic cues, a structure of said user notes and a format of said user notes.

20. The method of claim 18, further comprising the step of interpreting said information requests in context to generate a semantic representation that encodes a meaning of said information requests.

21. The method of claim 18, wherein one or more indentations in said user notes establish semantic links between one or more of:
one or more information terms; and
said plurality of information requests.

22. The method of claim 18, wherein said plurality of information requests are delineated by a symbol.

23. The method of claim 18, wherein said generating step is triggered by an escape operation.

24. A method for retrieving information from one or more data sources based on user notes, comprising:
obtaining said user notes containing one or more information requests and one or more user-specified context guides;
identifying said one or more information requests from said user notes using one or more semantic rules, wherein said semantic rules identify a plurality of types of relations between two or more concepts to interpret said one or more information requests, wherein said semantic rules identify said information requests for automatic generation of one or more system-executable search queries applied to at least one external database;
interpreting at least one of said information requests based on said one or more user-specified context guides; and
generating said one or more system-executable search queries required for said at least one interpreted information request, wherein one or more steps of said method are performed by one or more hardware devices.

25. The method of claim 24, wherein said one or more user-specified context guides comprises one or more of syntactic cues, a structure of said user notes, and a format of said user notes.

26. The method of claim 24, further comprising the step of inferring at least a portion of said user notes based on a prior user note.

27. The method of claim 24, wherein one or more indentations in said user notes establish semantic links between one or more of:

one or more information terms; and said one or more information requests.

28. The method of claim 24, wherein said one or more information requests are delineated by a symbol.

29. The method of claim 24, wherein said generating step is triggered by an escape operation.

* * * * *